Jan. 26, 1965   H. F. CASTELIJNS   3,167,094
ELECTRO-DYNAMIC MOTOR OPERATED VALVE
Filed Sept. 8, 1961
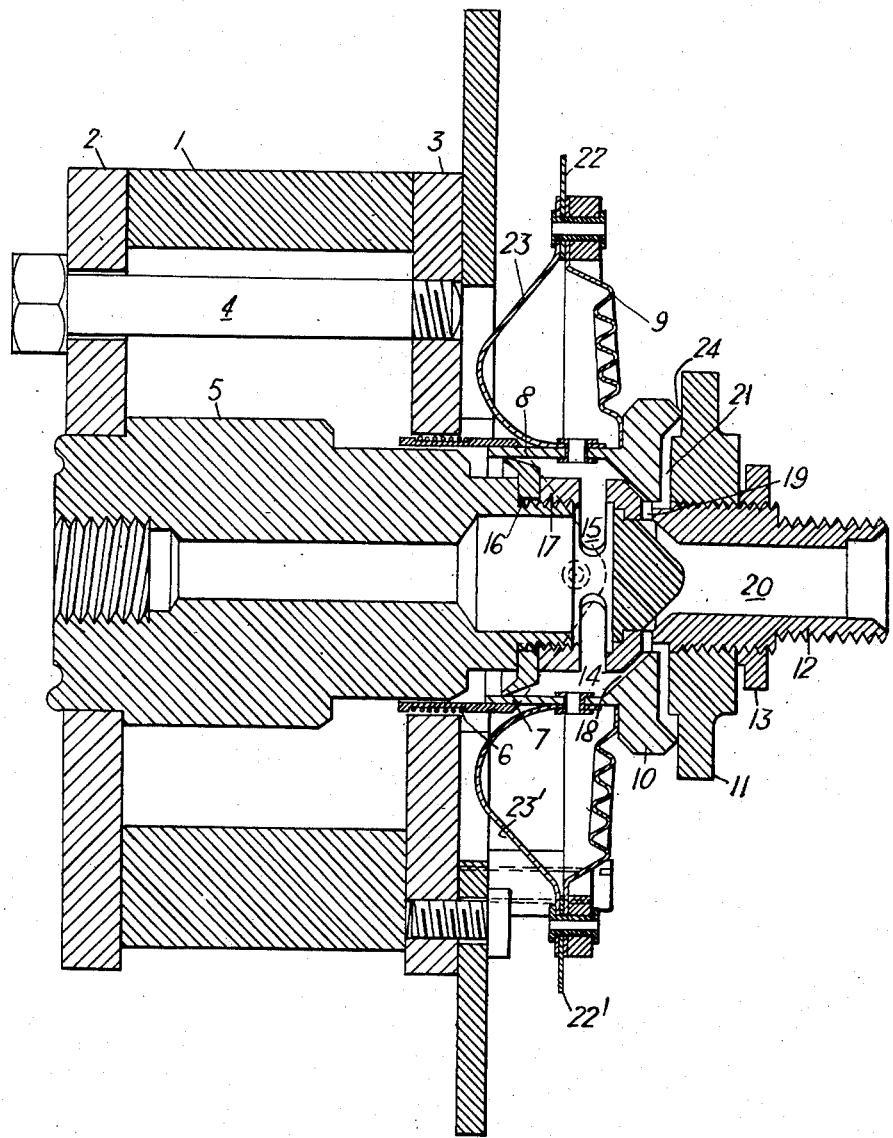
Inventor
HENRI F. CASTELIJNS United States Patent Office 3,167,094
Patented Jan. 26, 1965

3,167,094
ELECTRO-DYNAMIC MOTOR OPERATED VALVE
Henri Frans Castelijns, Antwerp, Belgium, assignor to International Standard Electric Corporation, New York, N.Y., a corporation of Delaware
Filed Sept. 8, 1961, Ser. No. 136,936
Claims priority, application Belgium, Sept. 15, 1960, 595,059
3 Claims. (Cl. 137—625.33)

The invention relates to a pneumatic valve driven by an electro-dynamic motor, the movable equipment of which is able to assume two stable positions.

Such an apparatus is already known, e.g. from Belgian Patent No. 517,967 (W. Pouliart—L. J. Nijs 22–36). However, due to the continuous progress in the various branches of the technique, it becomes necessary to increase the operating speed already attained by means of the valve described in this Belgian patent.

The object of the present invention is to realize a valve enabling this increase of speed.

According to a characteristic of the invention, the movable part of the valve is constituted by a light cylindrical part extending the movable coil of the motor. The free end of said movable coil acts on the extension of the central iron core of the motor to produce the pneumatic switching.

According to another characteristic, the central iron core of the motor is hollow and constitutes one of the air conduits of the valve whereas the other conduit is constituted by a tubular part which extends said central core but which is not in direct pneumatic communication with the latter.

According to still another characteristic, said two stable positions of the movable part of the valve are obtained pneumatically by reversing the sense of the resulting sum of the forces exerted on said movable part by the various air pressures.

The above mentioned and other objects and features of the invention will become more apparent and the invention itself will be best understood by referring to the following description of embodiments taken in conjunction with the accompanying drawing which represents a longitudinal view of the described valve.

In its preferred embodiment, the valve according to the invention comprises an electro-dynamic motor constituted by an annular permanent magnet 1 maintained between two magnetic flanges 2 and 3 by bolts such as 4, a central magnetic core 5 closing the magnetic field towards flange 3 and traversing the latter in its center, hereby forming an annular airgap according to the well-known conventional arrangement in which the movable coil 6 coiled on sleeve 7 is able to travel axially. The cylindrical part 8 is fixed on sleeve 7 and extends the latter axially.

The moxable equipment is suspended concentrically to core 5 by the flexible suspension 9 which permits the axial displacement of said equipment but maintains it concentric to core 5.

The free end of part 8 comprises a part which is slightly cup-shaped and which has a greater diameter 10. The travel of the movable equipment is limited on the one hand by a disc 11 against which the edge of part 10 abuts, and on the other hand by the conical part 14 of part 12, against which abuts the inner wall of part 10. Disc 11 is screwed onto part 12 fixed to core 5 and forms an extension of said core. The travel of the movable equipment may thus be varied by screwing disc 11 more or less. After having adjusted this travel, disc 11 is blocked by means of bolt 13. Core 5 is hollow and thus constitutes a sleeve which is used as a suction conduit to create a vacuum in the inside of part 8 through openings such as 15. A cup shaped piece 16 is fixed to core 5 by means of the threaded part 17 in order to prevent the outside air from entering the inside of part 8.

The operation is as follows: when the movable equipment is in the position represented on the figure, the vacuum existing inside part 8 is communicated via the conical conduit 18 and the radical openings 19 to the conduit 20 of part 12 to which is connected (not represented) the apparatus controlled by the above described valve. Part 10 being applied against disc 11, the outside air cannot penetrate into chamber 21 and due to this chamber being in communication with the holes 19, it is subjected to the same vacuum as these holes. Under these conditions, the position of the movable equipment represented on the figure is stable because the pressure of the outside air acts on the outside surface of part 10 to produce a resultant sum of forces in the direction of disc 11.

When the vacuum created in the conduit 20 has to be suppressed, an electrical current pulse of suitable polarity is applied to the movable coil 6 (connected to terminals 22 and 22' by means of conductors 23 and 23'). By the effect of this electrical pulse, the movable coil displaces the movable equipment towards the left, and due to this movement the air passage through the conical conduit 18 is interrupted while an opening is created at 24. The outside air may then penetrate through chamber 21 and holes 19 into conduit 20. As soon as this position is reached, it is in its turn stabilized pneumatically. Indeed, due to the fact that air at outside pressure is present on the right-hand wall of part 10, the direction of the resultant sum of forces acting on the movable equipment is reversed so that part 10 is applied against the conical wall 14.

If it is now necessary to create again an air vacuum in the conduit 20, it is sufficient to apply to the movable coil 6 a current pulse having a polarity opposite to that of the above cited pulse; due to this pulse, the movable equipment will be moved towards the right and will assume the stable position first described. It will be understood that these changes of position may be effected at very high speed. It is also to be noted that if it is desired to operate the above described valve with a pressure other than the atmospheric pressure acting at the outside of part 10, it is sufficient to envelop the valve with a cap permitting the application of this other pressure, provided that the latter is superior to the pressure present in the inside of the central conduit of core 5.

While the principles of the invention have been described above in connection with specific apparatus, it is to be clearly understood that this description is made only by way of example and not as a limitation on the scope of the invention.

I claim:
1. A pneumatic valve comprising:
  an electrodynamic motor including a central core, disposed coaxially about a central axis;
  a movable coil disposed coaxially about said core, said coil moving axially in a first direction upon the application of a first pulse to said coil, and moving in a second direction opposite to said first direction upon the application of a second pulse of opposite polarity to said first pulse; and
  valve operating means in said pneumatic valve including
    a stationary member disposed coaxially about said central axis and fixed to one end of said core and extending therefrom axially;
    a movable member disposed coaxially about said one end of said core and said stationary member fixed thereto, means coupling said movable member to said movable coil so that movement of said coil moves said movable member in an axial direction, said movable member having a first locked position in contact with one portion of said stationary member and a second locked position in contact with a second portion of said stationary member, said movable member coming unlocked and moving from said first position to said second position upon said application of said pulse to said coil, and coming unlocked and moving from said second position to said first position upon said application of said pulse of opposite polarity to said first pulse to said coil.

2. A pneumatic valve according to claim 1, wherein said core is hollow providing a first fluid conduit of said pneumatic valve and said stationary member is hollow providing a second fluid conduit of said pneumatic valve.

3. A pneumatic valve according to claim 2 wherein said stationary member has radial openings therein and said movable member in said first position cooperates with said openings to form passages indirectly connecting said first conduit to said second conduit, said passages being closed upon said movable member moving to said second position.

References Cited in the file of this patent
UNITED STATES PATENTS

| | | |
|---|---|---|
| 2,637,343 | Matthews | May 5, 1953 |
| 3,001,549 | Nelson et al. | Sept. 26, 1961 |